(12) United States Patent
Sudo et al.

(10) Patent No.: US 8,149,335 B2
(45) Date of Patent: Apr. 3, 2012

(54) PICTURE DISPLAY APPARATUS WITH SELECTIVELY DIVIDED SCREENS, PICTURE DISPLAY METHOD FOR SELECTIVELY DIVIDING SCREENS, AND STORAGE MEDIUM

(75) Inventors: Tatsuo Sudo, Chiba (JP); Katsuo Doi, Sakurai (JP); Masafumi Takahashi, Sakura (JP); Takuya Kinoshita, Chiba (JP); Soichi Nitta, Narashino (JP); Masafumi Hirata, Tokyo (JP); Kiyotaka Kashito, Kobe (JP); Aya Enatsu, Chiba (JP); Azusa Umemoto, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1288 days.

(21) Appl. No.: 11/878,263

(22) Filed: Jul. 23, 2007

(65) Prior Publication Data

US 2008/0024666 A1 Jan. 31, 2008

Related U.S. Application Data

(60) Provisional application No. 60/833,255, filed on Jul. 26, 2006.

(30) Foreign Application Priority Data

Jul. 25, 2006 (JP) ................................. 2006-202332

(51) Int. Cl.
*H04N 5/445* (2011.01)
*H04N 5/50* (2006.01)
*H04N 9/74* (2006.01)

(52) U.S. Cl. .......................... 348/569; 348/564; 348/588

(58) Field of Classification Search .................. 348/569, 348/565, 588, 554, 555, 553, 556, 564; 715/716–719, 721, 722, 764, 765, 781, 783, 715/788, 810, 838, 835; 725/38; 358/1.2, 358/1.13, 1.18

See application file for complete search history.

(56) References Cited

U.S. PATENT DOCUMENTS 4,967,381 A * 10/1990 Lane et al. ...................... 702/81
(Continued)

FOREIGN PATENT DOCUMENTS

EP 1 988 709 11/2008
(Continued)

OTHER PUBLICATIONS

Anonymous: "Owner's Guide-Qualia 005" [Online] 2005, Sony, Japan, XP002548279. Retrieved from the Internet: URL: http://www.docs.sony.com/release/KDX46Q005guide.pdf> pp. 74-76.

(Continued)

*Primary Examiner* — Victor Kostak
(74) *Attorney, Agent, or Firm* — Birch, Stewart, Kolasch & Birch, LLP

(57) ABSTRACT

A picture display apparatus, comprising: a synthesizing section for synthesizing divided screens to display a plurality of pictures on a single screen; a menu display section for displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement; an icon display section for displaying an icon indicating a border between the divided screens in association with the options; and a border changing section for updating the divided screens according to a change in position of the border, wherein the icon display section displays the icon indicating a result of the change in position of the border before the border changing section updates the divided screens according to the change in position of the border. Thus, the user is informed of what the screen will look like before entering a change of the border.

6 Claims, 12 Drawing Sheets

U.S. PATENT DOCUMENTS

| | | | | |
|---|---|---|---|---|
| 5,119,206 | A | * | 6/1992 | Rourke et al. ............... 358/296 |
| 5,448,377 | A | * | 9/1995 | Kinoshita et al. ............ 358/452 |
| 5,732,403 | A | * | 3/1998 | Nakamura .................... 715/209 |
| 5,875,305 | A | * | 2/1999 | Winter et al. ................ 709/231 |
| 6,366,263 | B1 | * | 4/2002 | Takasu et al. .................. 345/13 |
| 6,868,189 | B1 | * | 3/2005 | Hoshino ....................... 382/260 |
| 7,010,176 | B2 | * | 3/2006 | Kusunoki ..................... 382/299 |
| 7,062,190 | B2 | * | 6/2006 | Miyamoto ...................... 399/81 |
| 7,277,192 | B2 | * | 10/2007 | Kotani et al. ............... 358/1.13 |
| 7,375,768 | B2 | * | 5/2008 | Herberger et al. ............ 348/584 |
| 2003/0231259 | A1 | | 12/2003 | Yui et al. |
| 2005/0190295 | A1 | | 9/2005 | Mizutome et al. |
| 2006/0053468 | A1 | | 3/2006 | Sudoh et al. |
| 2007/0076235 | A1 | * | 4/2007 | Murata ........................ 358/1.13 |
| 2007/0088784 | A1 | | 4/2007 | Chiba et al. |
| 2007/0211174 | A1 | * | 9/2007 | Putterman et al. ............ 348/588 |

FOREIGN PATENT DOCUMENTS

JP    2001-69369 A    3/2001

OTHER PUBLICATIONS

Anonymous: "User Manual Toshiba 26L400V/32L400V (Japanese)" Toshiba User Manual, [Online] Feb. 18, 2004, XP003017312.

* cited by examiner

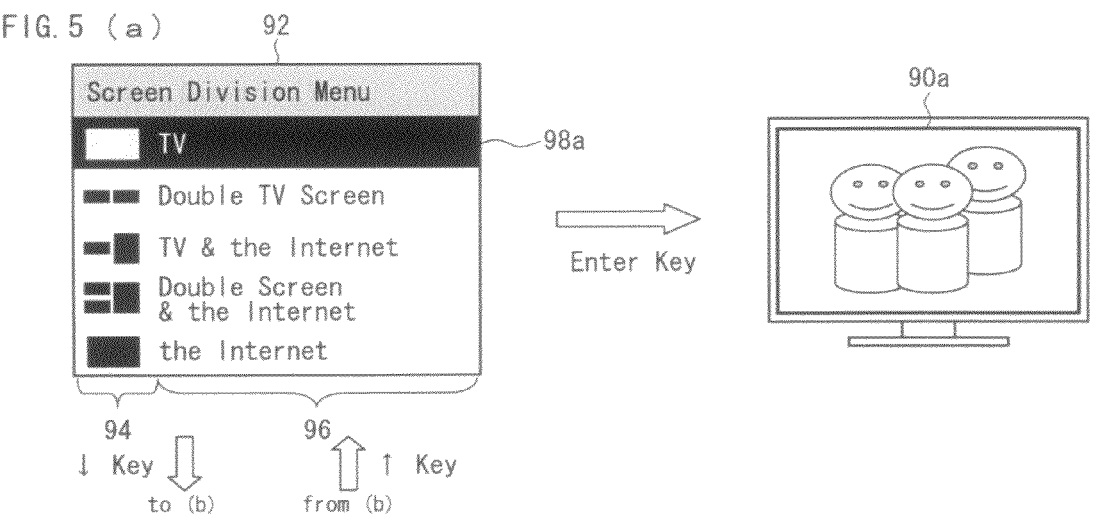
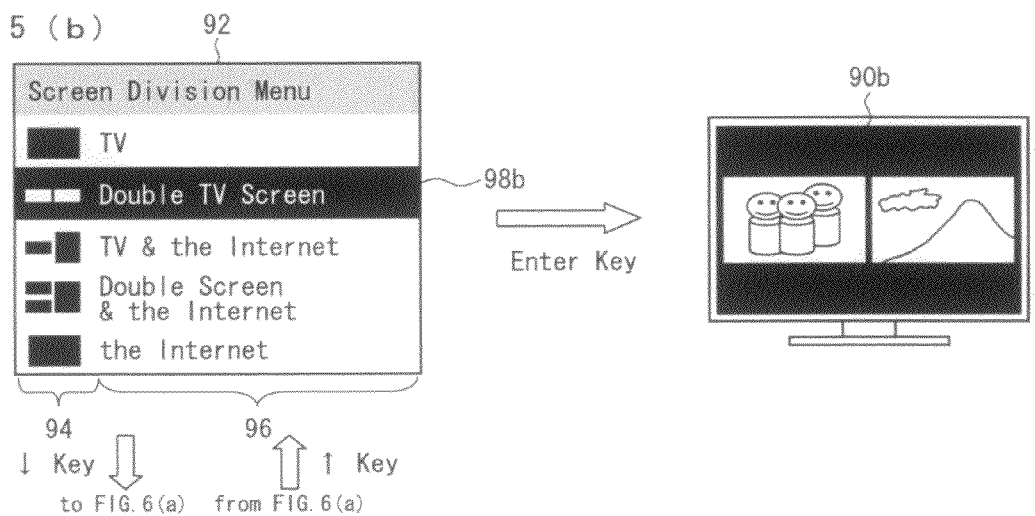

FIG. 6 (a)
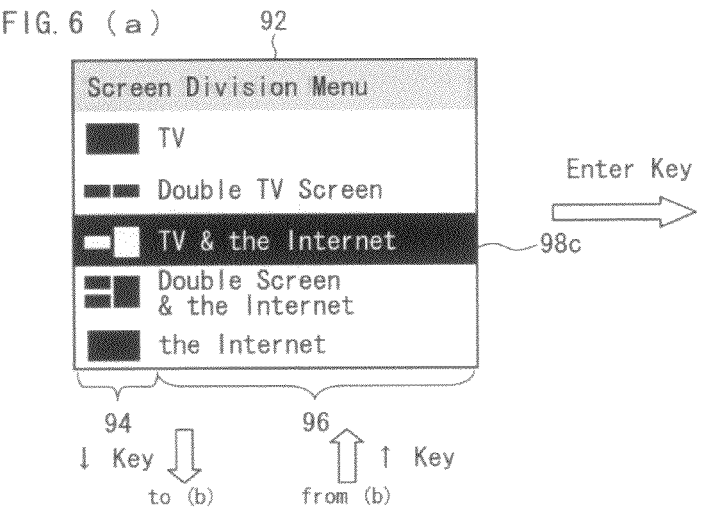
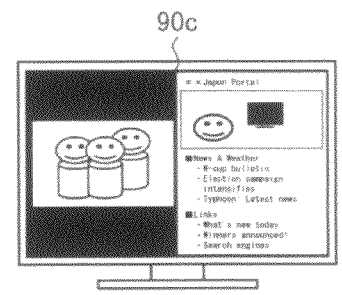
FIG. 6 (b)
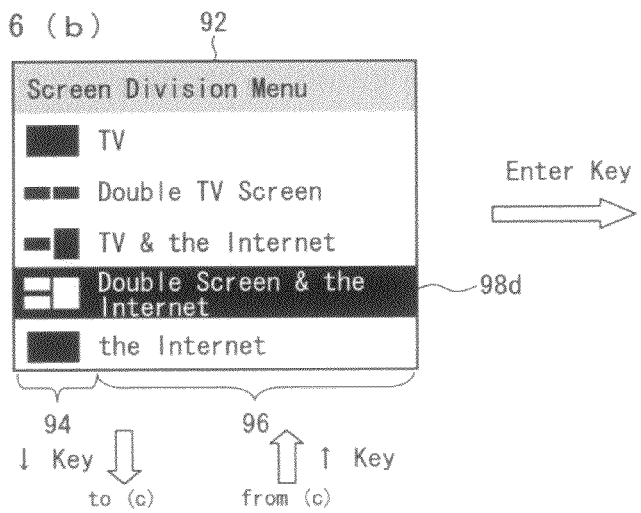
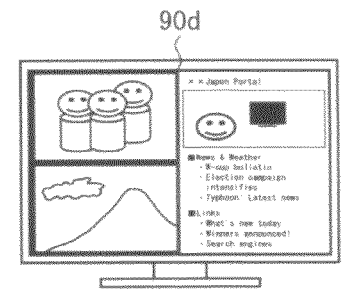
FIG. 6 (c)
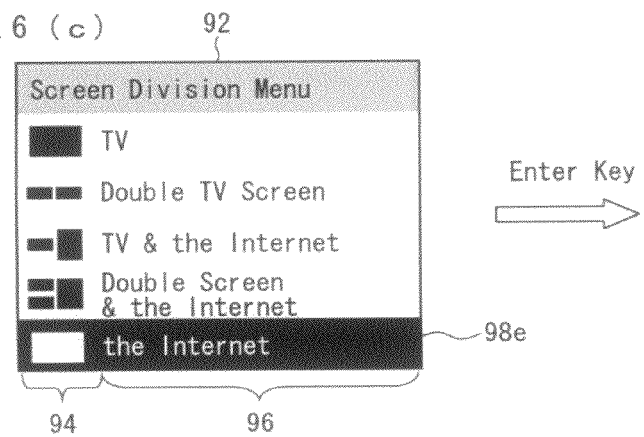
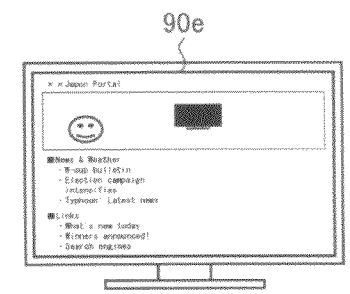

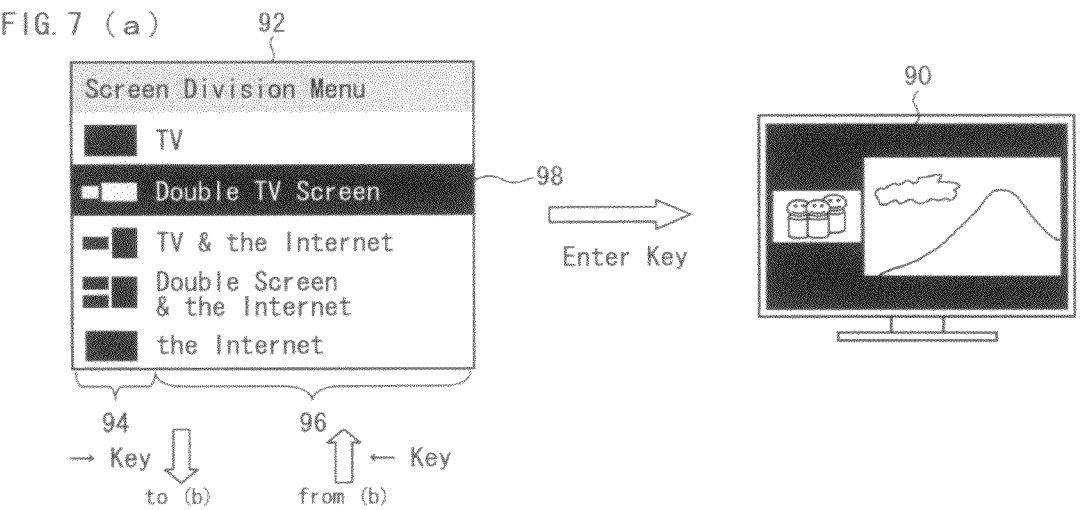
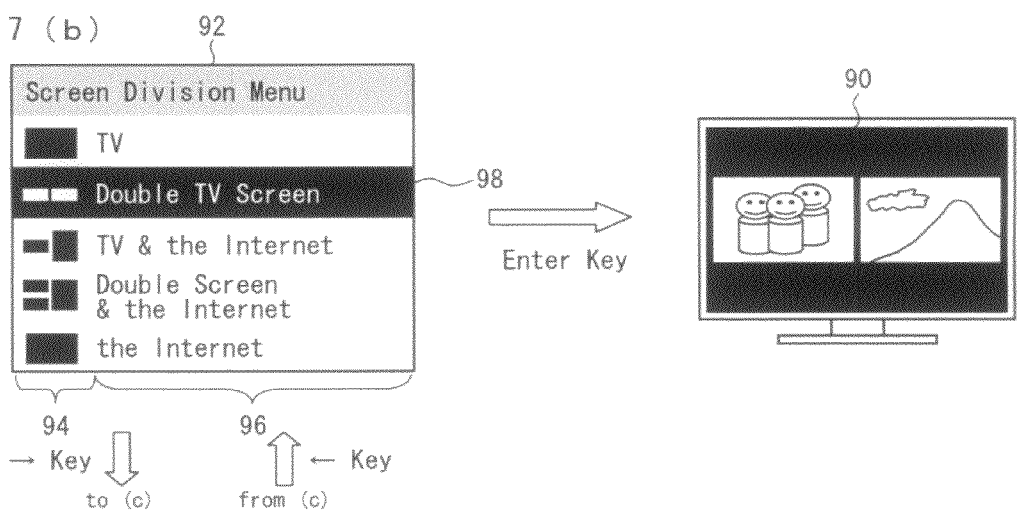
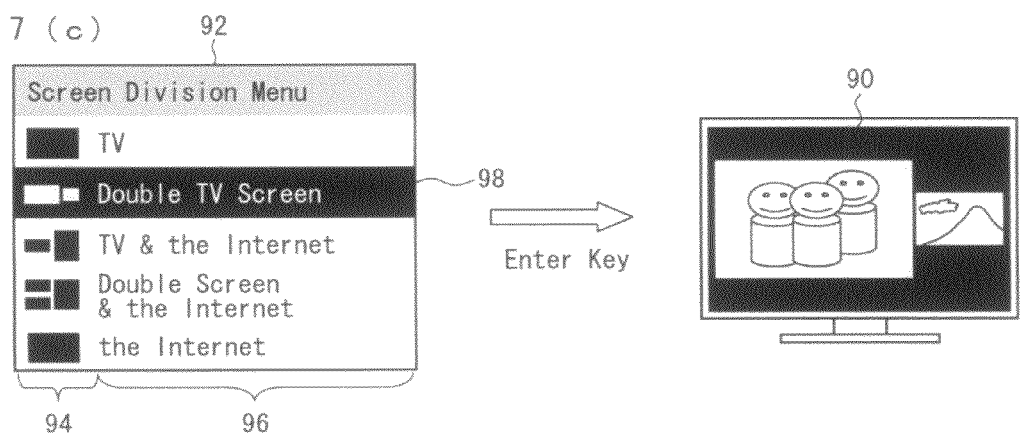

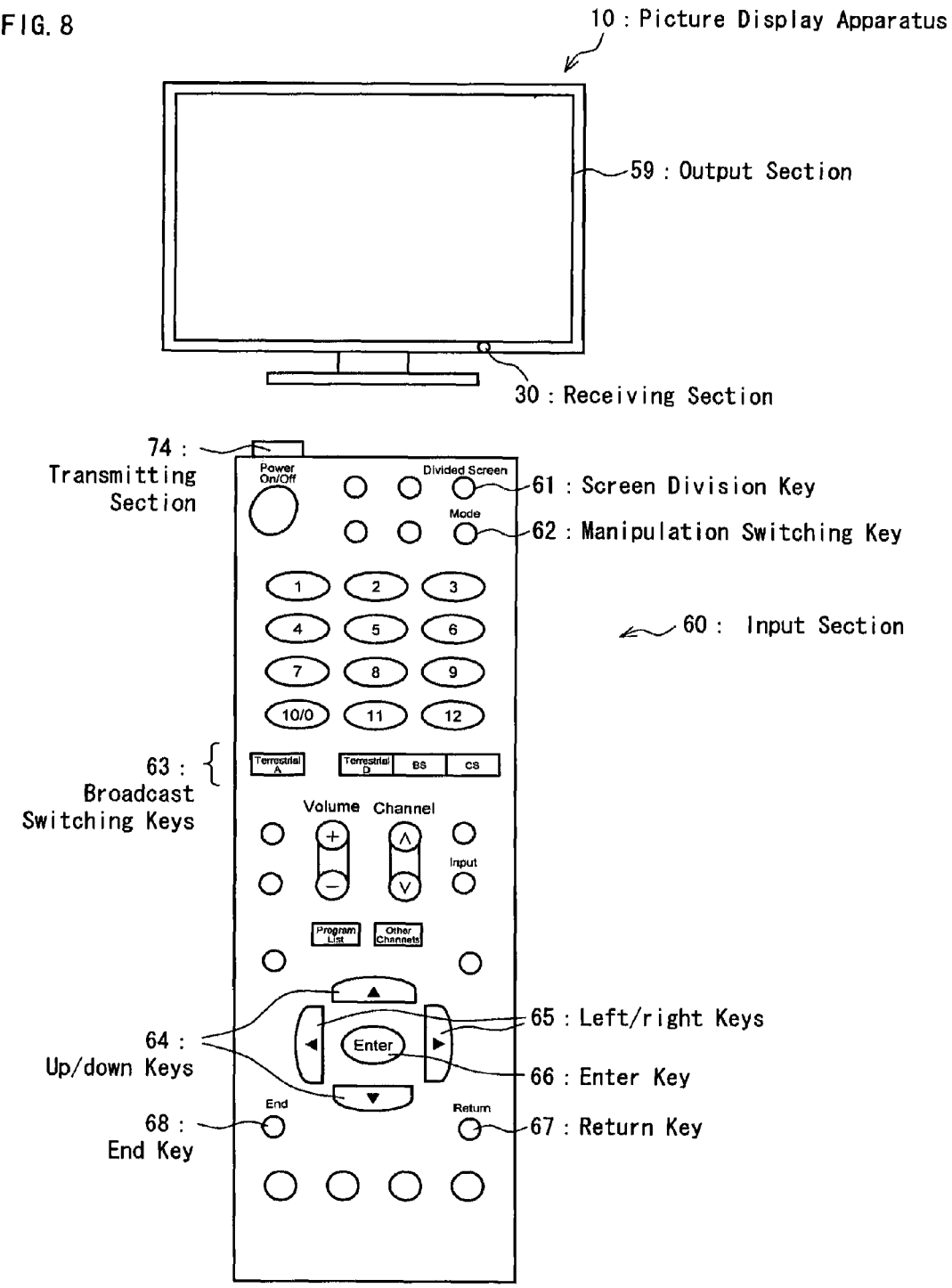

FIG. 10

| Event \ State | Channel Selection Related Key | Screen Division Key | Manipulation Switching Key | ↓, ↑, ←, → Keys | Enter Key | Return Key | End key | Screen Arrangement Changing Instruction (State, Coordinate Information) |
|---|---|---|---|---|---|---|---|---|
| 101 TV | Transfer Key Event to TV Application | | | | | | | |
| | | 100 | | | | | | |
| | | | | | | | | |
| 102 TV & TV | Transfer Key Event to Main TV Application | | Transpose Main Screen and Subscreen | | | | | |
| | | 100 | | | | | 101 (Main TV Only) | |
| | | | | | | | | |
| 103 TV & the Internet | Transfer Key Event to TV Application | | | Transfer Key Event to Browser | Transfer Key Event to Browser | Transfer Key Event to Browser | | |
| | | 100 | | | | | 101 | |
| | | | | | | | | |
| 104 Double TV Screen & the Internet | Transfer Key Event to Main TV Application | | Transpose Main Screen and Subscreen | Transfer Key Event to Browser | Transfer Key Event to Browser | Transfer Key Event to Browser | | |
| | | 100 | | | | | 101 (Main TV Only) | |
| | | | | | | | | |
| 105 the Internet | | | | Transfer Key Event to Browser | Transfer Key Event to Browser | Transfer Key Event to Browser | | |
| | 101 | 100 | | | | | 101 (Last Channel) | |
| | | | | | | | | |
| 100 Screen Division Menu Display | | Transfer Key Event to Screen Division Menu | | Transfer Key Event to Screen Division Menu | Transfer Key Event to Screen Division Menu | No Menu Display | No Menu Display | No Menu Display |
| | | | | | | Return to State Prior to Menu Display | Return to State Prior to Menu Display | Specified State (101 to 105) |
| | | | | | | | | |

FIG. 12

| Key Event<br><br>State<br>(Focus<br>Position) | Enter Key | ↑ Key | ↓ Key,<br>Screen<br>Division Key | ← Key | → Key |
|---|---|---|---|---|---|
| 201<br>TV | Issue Screen Arrangement Changing Instruction (201, Coordinate Information) Event | | | | |
| | | 205 | 202 | | |
| | | | | | |
| 202<br>TV & TV | Issue Screen Arrangement Changing Instruction (202, Coordinate Information) Event | | | Division Position Changing Process | Division Position Changing Process |
| | | 201 | 203 | | |
| | | | | | |
| 203<br>TV &<br>the Internet | Issue Screen Arrangement Changing Instruction (203, Coordinate Information) Event | | | Division Position Changing Process | Division Position Changing Process |
| | | 202 | 204 | | |
| | | | | | |
| 204<br>Double TV<br>Screen &<br>the Internet | Issue Screen Arrangement Changing Instruction (204, Coordinate Information) Event | | | Division Position Changing Process | Division Position Changing Process |
| | | 203 | 205 | | |
| | | | | | |
| 205<br>the Internet | Issue Screen Arrangement Changing Instruction (205, Coordinate Information) Event | | | | |
| | | 204 | 201 | | |
| | | | | | |

PICTURE DISPLAY APPARATUS WITH SELECTIVELY DIVIDED SCREENS, PICTURE DISPLAY METHOD FOR SELECTIVELY DIVIDING SCREENS, AND STORAGE MEDIUM

This nonprovisional application claims priority under 35 USC Section 119(a) of Patent Application No. 2006-202332 filed in Japan on Jul. 25, 2006, and claims the benefit under 35 USC Section 119(e) of U.S. Provisional Application No. 60/833,255 filed on Jul. 26, 2006, the entire contents of all of which are hereby incorporated by reference.

FIELD OF THE INVENTION

The present invention relates to picture display apparatuses, picture display methods, picture display programs, and storage media for displaying a plurality of pictures on a single screen. The invention relates especially to picture display apparatuses, picture display methods, picture display programs, and storage media for displaying a menu through which a user can change a screen arrangement to have a plurality of pictures displayed on a single screen.

BACKGROUND OF THE INVENTION

Recent picture display apparatus, of which a typical example is the television, includes more than one picture source, for example, a tuner and an optical disc drive. The apparatus divides the display screen into areas to display a plurality of pictures simultaneously. The apparatus allows the user to switch between a plurality of display modes (ex. a single and a double screen mode) by pressing a screen switching button on a remote controller or by like operation.

Switching between the single and double screen modes is easily done by, for example, pressing a "Double Screen" button. A problem rises, however, when three or more display modes (ex. a single, a double, and a quadruple screen mode) are involved: sequential switching among these modes using one button is troublesome.

To address the problem, Japanese Unexamined Patent Publication (Tokukai) 2001-69369 (published Mar. 16, 2001) discloses a television receiver displaying a menu in response to a user pressing an "Easy Selection" button, the menu listing a plurality of modes from which a desired mode is selectable.

The method disclosed in the patent has problems that the user is not informed of the current function settings and has to go through complex steps to change the settings.

Specifically, the technology of Tokukai 2001-698369 shows the number of screens displayed next to each other. The user is not informed of the actual layout. This is not user-friendly when a large divided screen appears next to a small divided screen and when a web browser or similar picture of unbound aspect ratio is displayed.

Furthermore, if the divided screen or screens are resized following a change in the number of divided screens displayed next to each other, a divided screen resizing menu needs to be displayed after the selection of the number of divided screens so that the user can make selections about the resizing. This requires the user to make several inputs to switch between display modes, which makes the operation complicating.

SUMMARY OF THE INVENTION

The present invention, conceived to address these problems, has an objective of providing a picture display apparatus, a picture display method, a picture display program, and a storage medium which enable the user to easily switch between pictures displayed in divided screens and resize and rearrange the divided screen(s) in which pictures are displayed.

The picture display apparatus of the present invention, to solve the problems, is characterized in that it includes: a synthesizing section for synthesizing divided screens to display a plurality of pictures on a single screen; a menu display section for displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement; a layout display section for displaying an icon indicating a border between the divided screens in association with the options; and a border changing section for updating the divided screens according to a change in position of the border, wherein the layout display section displays the icon indicating a result of the change in position of the border before the border changing section updates the divided screens according to the change in position of the border.

According to the arrangement, a menu is displayed for the user to make a selection so as to change to the screen arrangement according to which a plurality of pictures are displayed on a single screen. In the menu, an icon is displayed which indicates the position of the border between divided screens in which the pictures are displayed. Thereafter, the icon indicates a new position of the border before updating the screen according to a change in position of the border. Thus, the user is informed of what the screen will look like before entering a change of the border.

The picture display method of the present invention, to solve the problems, is characterized in that it involves the steps of: synthesizing divided screens to display a plurality of pictures on a single screen; displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement; displaying an icon indicating a border between the divided screens in association with the options; displaying the icon indicating a result of the change in position of the border before updating the divided screens according to the change in position of the border; and updating the divided screens according to the change in position of the border.

According to the arrangement, a menu is displayed for the user to make a selection so as to change the screen arrangement (layout) according to which a plurality of pictures are displayed on a single screen. In the menu, an icon is displayed which indicates the position of the border between the divided screens. Thereafter, the icon indicates a new position of the border before updating the screen according to a change in position of the border. Thus, the user is informed of what the screen will look like before entering a change of the border.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 5(a) is an illustration of detailed actions on the screen division menu displayed on the picture display apparatus.

FIG. 5(b) is an illustration of detailed actions on the screen division menu displayed on the picture display apparatus.

FIG. 6(a) is an illustration of detailed actions on the screen division menu displayed on the picture display apparatus.

FIG. 6(b) is an illustration of detailed actions on the screen division menu displayed on the picture display apparatus.

FIG. 6(c) is an illustration of detailed actions on the screen division menu displayed on the picture display apparatus.

FIG. 7(a) is an illustration of detailed actions on the screen division menu displayed on the picture display apparatus.

FIG. 7(b) is an illustration of detailed actions on the screen division menu displayed on the picture display apparatus.

FIG. 7(c) is an illustration of detailed actions on the screen division menu displayed on the picture display apparatus.

FIG. 8 is a schematic illustration of the appearance of the housings of the output and input sections of the picture display apparatus.

FIG. 10 is a state transition table equivalent to the state transition diagram in FIG. 9 for the picture display apparatus.

FIG. 12 is a state transition table equivalent to the state transition diagram in FIG. 11 for the picture display apparatus.

DESCRIPTION OF THE EMBODIMENTS

The following will describe an embodiment of the present invention in reference to FIGS. 1 to 12. The present embodiment will describe, as an example of the picture display apparatus, a digital television which includes a control section as a processing section, a display screen as an output section, and a remote controller as an input section. This is by no means intended to be limiting the invention. Conventional external tuners, video recorders for various types of media, and like electronic apparatus can function as the picture display apparatus if they are built in with a processing device including those functions which will be described in the following.

In addition, the following will describe the present invention in terms of a picture display apparatus with a built-in display apparatus as the display screen. This is by no means intended to be limiting the invention. A touch panel can be used as the output and input sections. Manipulation keys on the main body of the picture display apparatus may be used as the input device.

In addition, the picture displayed on the picture display apparatus may be picture signals received on a broadcast wave or fed from an external input apparatus. Also, the picture may be still image data, text data, HTML or other XML data specifying a data layout, or binary data in any given format.

Figure 1:
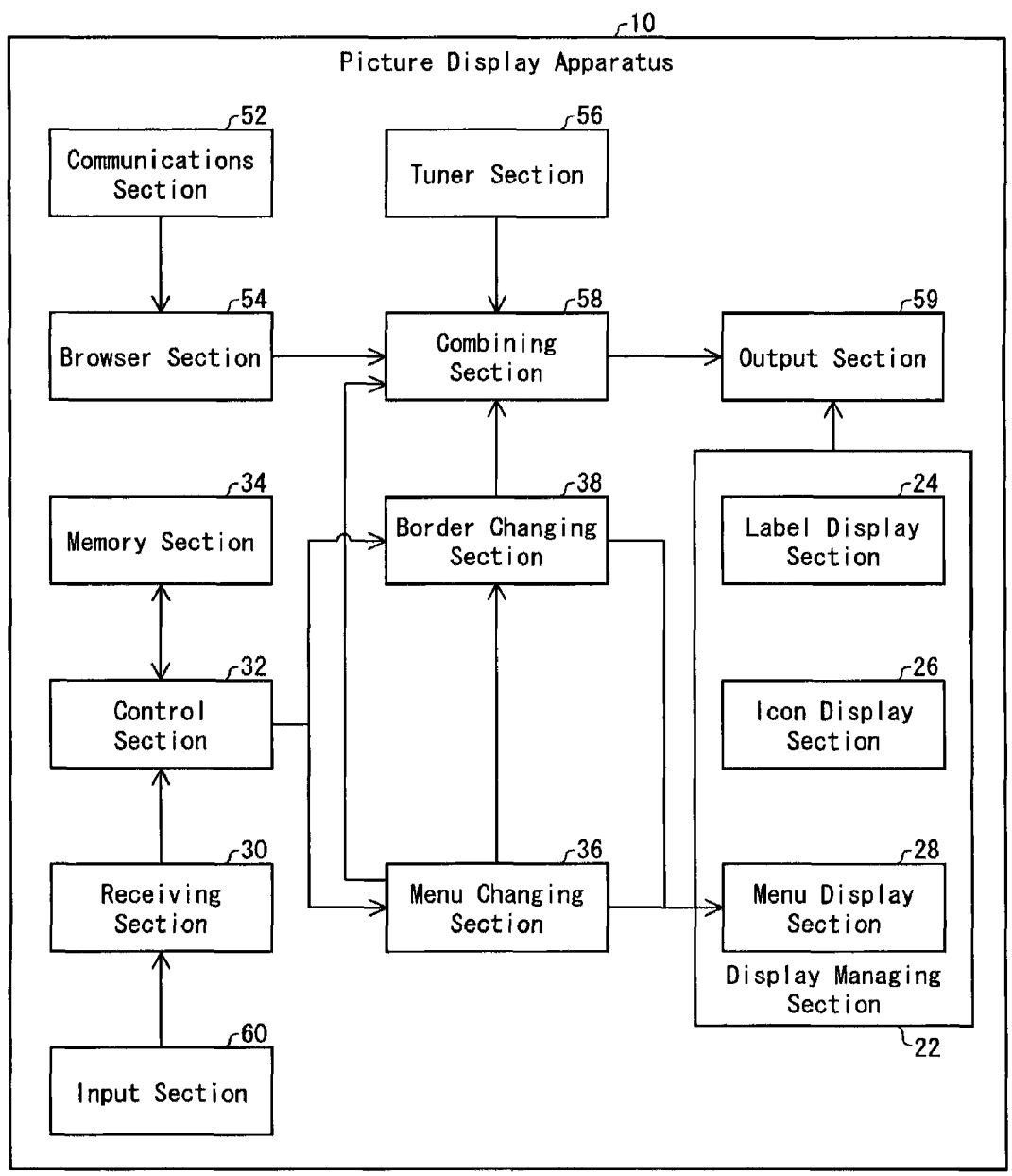
FIG. 1 illustrates an embodiment of the present invention. A functional block diagram illustrating the configuration of a display switch section, output section, and input section in a picture display apparatus.

FIG. 1 is a block diagram schematically showing the functions of various sections of the picture display apparatus (picture display apparatus) 10 of the present embodiment. The picture display apparatus 10 includes a display managing section 22, a receiving section 30, a control section 32, a memory section (change information memory means) 34, a menu changing section (menu changing means) 36, a border changing section (border changing means) 38, a communications section (related information receiving means) 52, a browser section 54, a tuner section (related information receiving means) 56, a synthesizing section (synthesizing means) 58, an output section 59, and an input section 60.

The display managing section 22 further includes a label display section 24, an icon display section (layout display means) 26, and a menu display section (menu display means) 28. The display managing section 22 displays information to the user in the form of a menu, labels, and icons, prompting the user to enter screen arrangement switching inputs.

Hereinafter, a screen shall refer to the entire area, from the upper left to the lower right, of the output section 59. A divided screen on the screen shall refer to one of divided parts into which the screen is divided. Each divided screen displays one picture.

A border shall refer to a dividing line between a divided screen on the screen and another. The user can resize and rearrange the divided screens by moving the border. A screen arrangement, or layout, shall refer to settings for divided screens on the screen. That is, a set of divided screens containing information on the sizes, arrangement, etc. of the divided screens on the screen is termed a screen arrangement, or layout.

Some of the accompanying drawings show the term "double screen," which indicates that there are two types of divided screens and two types of pictures displayed in the divided screens. "Single screen" indicates that there is one picture and one divided screen. "Double screen & the Internet" indicates that there are three types of divided screens and three types of pictures one of which is a browser display.

The label display section 24 displays, in a label display area 96 of the menu 92, a label which identifies a new layout. In the label display area 96 is displayed information which identifies different layouts by text. The label display area 96 displays an explanation on the content of the screens being displayed: e.g., "TV," "Double TV Screen," "TV & the Internet," "Double Screen & the Internet," and "the Internet."

The icon display section 26 displays divided screen layout information in the form of icons in a layout display area 96 in the menu 92. The icons indicate the sizes and layout of the divided screens, such as "TV" and "the Internet," in association with the label display area 96 so that the user can recognize the divided screen layout and divided screen border positions visually and intuitively.

The menu display section 28 associates the label display area 96 and the layout display area 94, presents a result as options in screen switching to the user, and displays as a menu enabling the user to select a layout switching. Specifically, the menu 92 shows a plurality of options on top of each other, one of the options, for example, consisting of an icon indicating a single divided screen and associated text "TV" next to the icon, so that the user can select one of the options by manipulating up/down keys. Details of the menu 92 with a label display area 96 and a layout display area 94 will be given later.

The receiving section 30 receives user inputs through the input section 60 and feeds them to the control section 32. The receiving section 30 may include an infrared receiver, wireless receiver, optical communications receiver, signal input receiver, or other various receiver depending on the configuration of the transmitting section in the input section 60.

Based on manipulation signal inputs through the receiving section 30, the control section 32 gives the display managing section 22 instructions as to a display, accesses required information in the memory section 34, and instructs the menu changing section 36 to update the display according to results of the user inputs. The memory section 34 is a memory device for holding template information, such as label information, icon information, layout information, and menu information, which the display managing section 22 needs to produce a display. The control section 32 may record/store, in the memory section 34, data which is fed where necessary.

Based on the manipulations inputs fed from the control section 32, the menu changing section 36 gives the menu display section 28 instructions to update the screen display according to the results selected and entered by the user. In addition, the menu changing section 36 feeds the result of the selection by the user to the border changing section 38 so that the section 38 performs layout switching. The border changing section 38 transmits a control signal to the synthesizing section 58 based on the instructions from the menu changing section 36 so that the section 58 performs layout switching.

The communications section 52 connects to an external network over the Internet, for example, to receive various data. Specifically, the communications section 52 receives Web data, email data, etc. The browser section 54 displays what is reproduced from the various data received by the communications section 52. Specifically, the browser section 54 runs a browser, email client, etc. to output what is reproduced from the data received by the communications section 52. The tuner section 56 receives broadcast radio waves and electronic program table data and decodes the received image signals and electronic program table data for output. Specifically, the section 56 selectively receives broadcast signals, such as terrestrial analog broadcasts, terrestrial digital broadcasts, and BS/CS digital broadcast. Here, a digital broadcast receiving tuner is taken as an example for description. This is by no means intended to be limiting the invention.

The synthesizing section (synthesizing means) 58 synthesizes divided screens based on the control signals from the border changing section 38 so that the data image received by the communications section 52, the broadcast picture received by the tuner section 56, etc. can be displayed in the divided screens. Here, the picture outputs from the communications section 52 and the tuner section 56 are synthesized for an on-screen display, as an example. Pictures may be received from an optical disc reader device or any other various picture input sources for output on the divided screen.

The output section 59 is an output device for outputting the display signals from various sections in the display managing section 22 and the screen synthesized by the synthesizing section 58. The section 59 is, for example, an image display element built around liquid crystal, organic EL (Electro Luminescence), etc, or a display device such as a CRT (Cathode Ray Tube). The invention is not limited to any particular types of display devices. The embodiment is described taking as an example the picture display apparatus 10 including a display device as the output section 59. This is by no means intended to be limiting the invention. The picture display apparatus 10 may be that which outputs a plurality of divided screens and a manipulation menu to an external display device for display.

Figure 2:
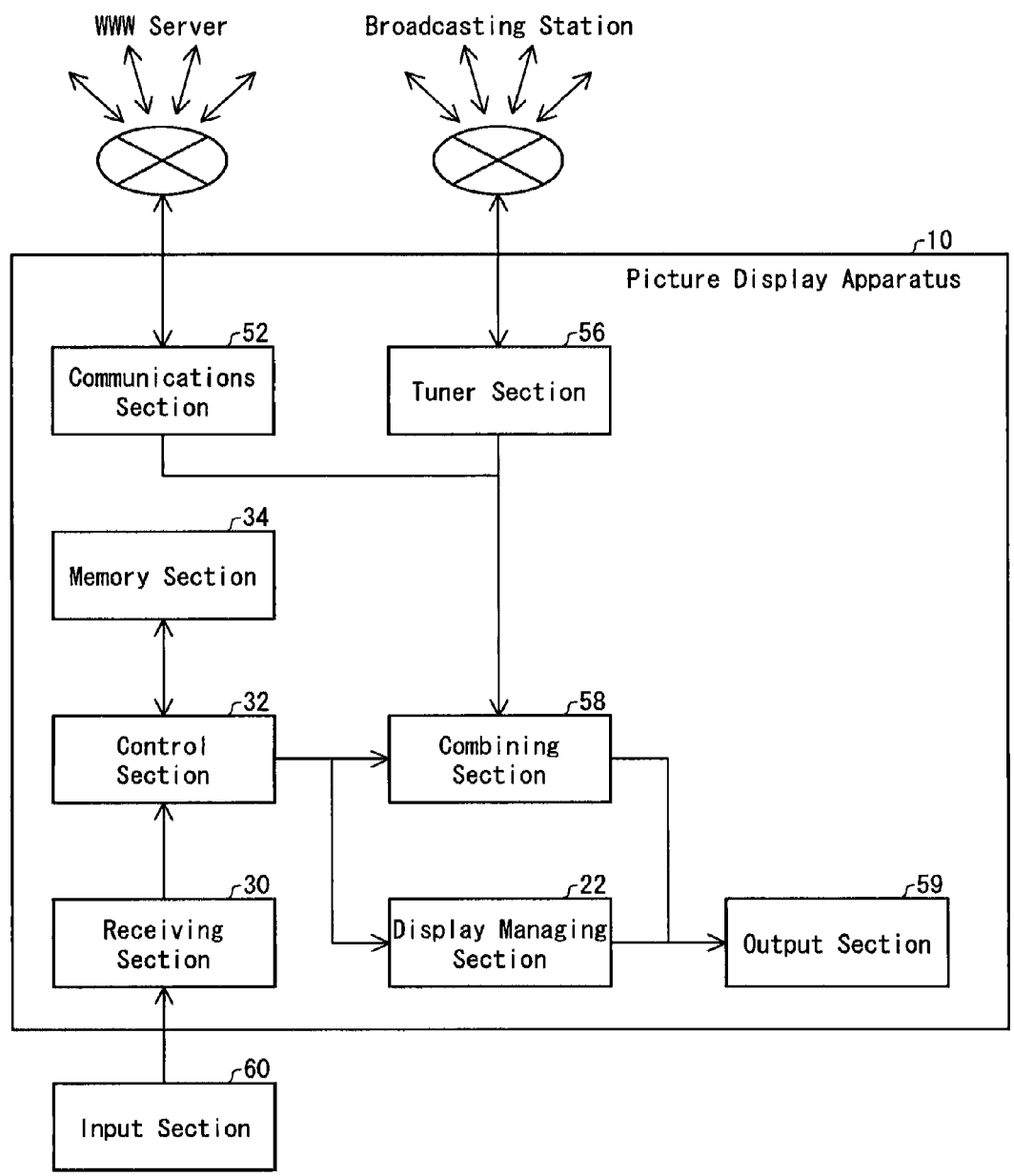
FIG. 2 is a schematic illustration of major display parts of the picture display apparatus.

Next, referring to FIG. 2, a flow will be described for displaying a screen by the picture display apparatus 10 in the present embodiment. FIG. 2 is a schematic illustration of a flow of the picture display apparatus 10 producing a display of synthesized pictures from a plurality of sources in divided screens into which the screen is divided.

The input section 60, referring to a remote controller, is an input device enabling the user to enter inputs. The receiving section 30, referring here to an infrared receiving section, is a communications interface for infrared communications with the remote controller.

The control section 32 is a control unit which receives manipulation signals and data from various sections and gives instructions for suitable control, manipulation, recording, and other operations. Here, the section 32 controls various sections to perform various processes based on manipulation information received by the receiving section 30.

Major processes include: the tuner receiving pictures from broadcast stations, the synthesizing section 58 synthesizing from received picture sources and the display section 59 displaying the result in divided screens, the communications section 52 receiving data from a server, the display managing section 22 producing divided screens from received data and data in the memory section and the output section 59 displaying the result, user manipulation for program viewing, browser manipulation, and the memory section 34 recording information on, for example, results of, for example, changes to settings.

The communications section 52, in response to an instruction from the control section 32, accesses a server using the HTTP or another Internet protocol to obtain data. The tuner section 56 receives broadcast waves and feeds to the synthesizing section 58. The communications section 52, in response to an instruction from the control section, accesses a server using the HTTP or another Internet protocol to obtain data.

Figure 3:
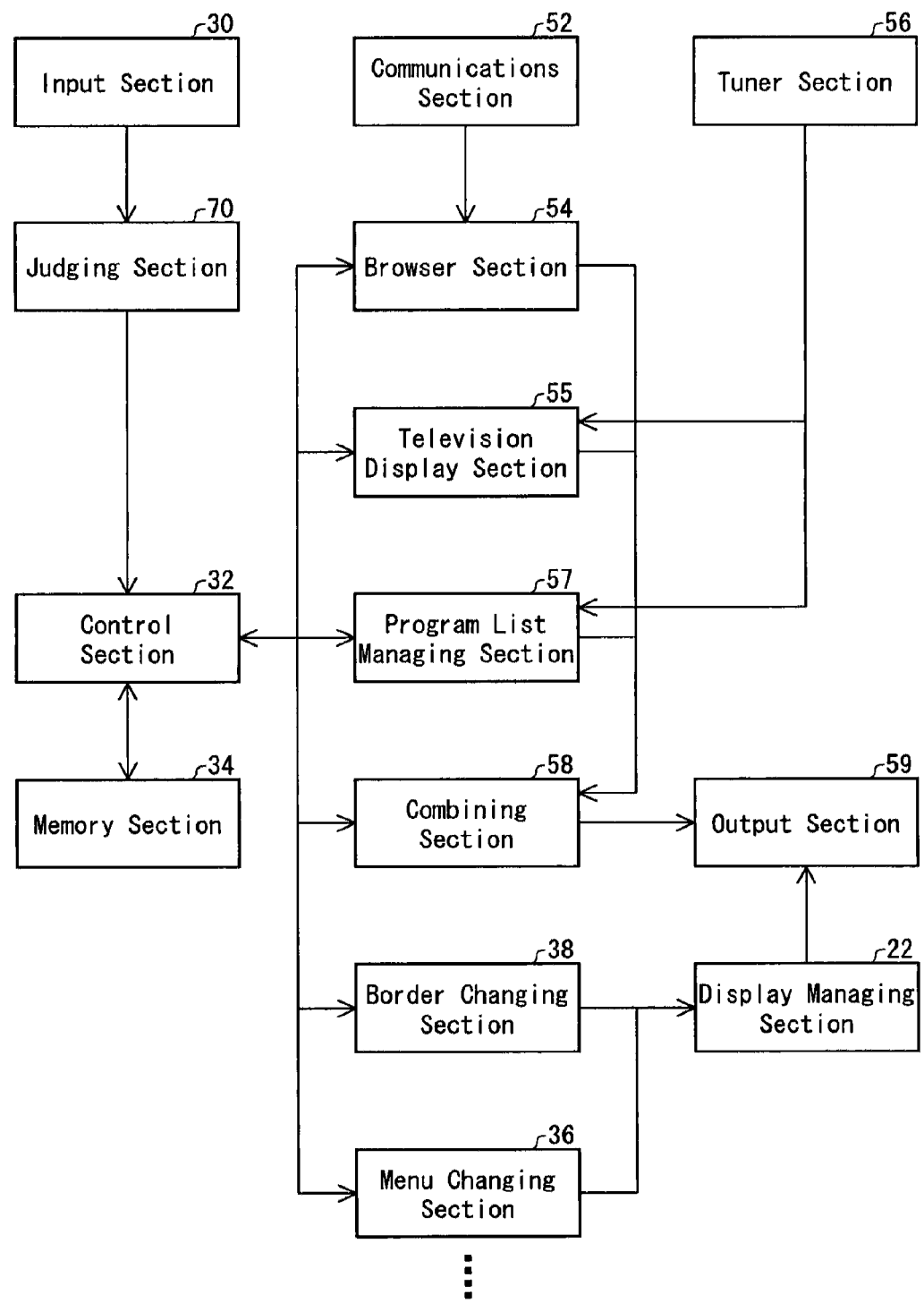
FIG. 3 is a schematic illustration of major event processing parts of the picture display apparatus.

Next, a flow of event processing in the control section 32 will be described in reference to FIG. 3. FIG. 3 is a schematic illustration of a flow of event processing performed by the picture display apparatus 10 to synthesize, from video sources, the divided screens into which the screen is divided and display a result.

The judging section 70, upon detecting a user manipulation via the receiving section 30, outputs to the control section 32 a manipulation information communicating event indicating the particulars of the manipulation. Specifically, the section 70 determines which key has been pressed and feeds that information to the control section 32. The judging section 70 may identify a particular command input from, for example, button manipulations like keeping a button down for a period, releasing a button after keeping it down for a while, pressing a button repeatedly, and pressing two or more button at the same time, and output the result to the control section 72.

The control section 32 instructs various sections (detailed later) to execute various processes in response to, for example, a key event communicated from the judging section 70, an application event communicated from the browser or other applications, and a timer event communicated from a timer (not shown). The control section 32 manages a state transition table, determining the content of processes from the correspondence between the current state and the received event and controlling various sections to execute the processes.

The browser section 54 is a processing section running a so-called WWW browser. In accordance with the event received from the receiving section 30, the judging section 70, and the control section 32, the section 54 (1) obtains an HTML document, image data, etc. via the communications section, (2) analyzes the received HTML document, (3) makes the synthesizing section display the analyzed HTML document and image data, (4) writes cache data to the memory section, (5) loads bookmarks, proxy information, etc. from the memory section.

The television display section 55 decodes the broadcast wave received from the tuner section 56 and displays a result on the output section 59 via the synthesizing section 58. Since decoding is usually handled by hardware, the picture data may be supplied directly from a television application to the output section 59 for decoding and display, In addition, the television display section 55 adjusts the sound volume and selects a channel in response to a user command.

The program list managing section 57, although we give no particular details about it in the specification, regularly obtains program list information via the tuner section 56. The section 57 also instructs to display the program list information in accordance with a user command.

The menu changing section 36 tracks (1) the current layout, that is, the current number of divided screens and the current position(s) of the divided screen border(s) and (2) instructs the display managing section 22 to display a screen division menu 92, a focus change display in which to determine for which divided screen and video source the inputs are intended, a division position change display in which to change the position of a border and the number of divided screens, etc. in accordance with key event received via the receiving section 30, the judging section 70, and the control section 32.

The display managing section 22 instructs the planes of the output section 59 to draw pictures. The section 22 also manages buffer off screen and on screen.

There may be further provided a function settings managing section (not shown) which handles various menus, for example, color and brightness picture settings, manages the current state, when there is a change command input from the user, update accordingly and saves the settings to the memory section, and instructs the display managing section to display in response to a user manipulation.

Figure 4:
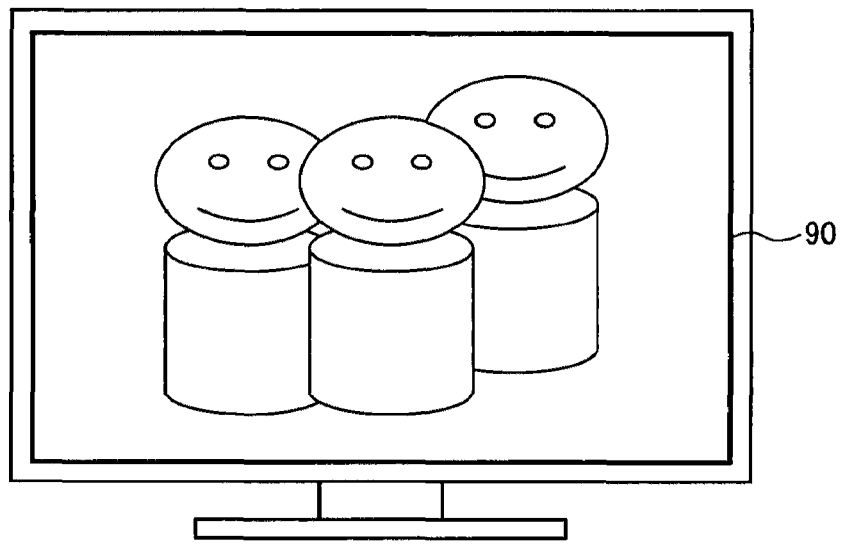
FIG. 4(a) is a schematic illustration of a screen division menu superimposed on the display on the picture display apparatus.
FIG. 4(b) is a schematic illustration of a screen division menu superimposed on the display on the picture display apparatus.
Figure 4:
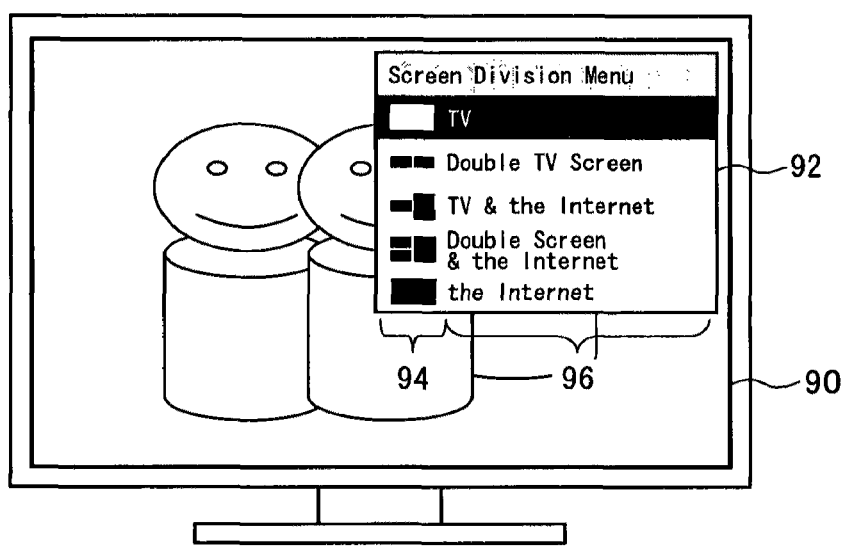

Next, referring to FIGS. 4 to 7, an execution flow will be described in response to a video source switching manipulation and a divided screen border changing manipulation on the screen division menu. FIG. 4 is an illustration of the display screen 90 and the screen division menu 92 superimposed on the display screen 90. FIGS. 5(*a*), (*b*), 6(*a*), (*b*), (*c*), and 7(*a*), (*b*), (*c*) are illustrations of detailed actions of the screen division menu 92.

FIG. 4(*a*) illustrates a default display screen 90 being produced on the picture display apparatus 10. The display screen 90 shows 3 persons. In this situation, as the screen division key 61 on the input section 60 is pressed, the screen division menu 92 is displayed in the upper right area of the display screen 90 as shown in FIG. 4(*b*). The screen division menu 92 shows the title "Screen Division Menu" at the top. Below that, the layout display area 94 and the left and the label display area 96 are displayed next to each other, the layout display area 94 to the left and the label display area 96 to the right.

The layout display area 94 shows icons indicating screen layouts in a way corresponding to screen division formats. The label display area 96 shows text descriptions corresponding to the icons indicating screen layouts. Here, the text "TV," "Double TV Screen," "TV & the Internet," "Double Screen & the Internet," and "Internet" (top to bottom) is displayed as labels in association with the icon.

FIGS. 5 to 7 are enlarged views of the screen division menu 92. The following will sequentially describe a selecting manipulation and a divided screen display format decision on the screen division menu 92 by the user.

FIG. 5(*a*) shows the initial state of the screen division menu 92. The "TV" option is being selected in the screen division menu 92 by the highlight 98*a*. The screen division menu 92 shows a selected on-screen layout in highlight as shown in FIG. 5; this is by no means intended to be limiting the invention. Any display format may be used so long as the user can recognize a selected state of an object.

If the enter key 66 is pressed when the highlight 98*a* is on the "TV" option, the border changing section 38 of the processing section 20 transmits a control signal to the synthesizing section 58 so that the received television picture can be displayed in a single screen like on the display screen 90*a*.

If the "↓" key, among the up/down keys 64, is pressed in the state shown in FIG. 5(*a*), the screen division menu 92 is changed to the state shown in FIG. 5(*b*).

FIG. 5(*b*) illustrates the "Double TV Screen" option being selected by the highlight 98*b*. If the enter key 66 is pressed when the highlight 98*b* is on the "Double TV Screen" option, the border changing section 38 of the processing section 20 transmits a control signal to the synthesizing section 58 of the output section 59 so as to display one of the television pictures in which the persons are being displayed in the left-hand side and the other television picture in which a mountain scenery is being displayed in the right-hand side as in the display screen 90*b*.

If the screen division key is pressed in the state shown in the display screen 90*b*, the screen division menu 92 may be displayed either as shown in FIG. 5(*b*) or as shown in FIG. 5(*a*).

If the "↓" key, among the up/down keys 64, is pressed in the state shown in FIG. 5(*b*), the screen division menu 92 is changed to the state shown in FIG. 6(*a*); if the "↑" key is pressed, the screen division menu 92 is changed to the state shown in FIG. 5(*a*).

FIG. 6(*a*) illustrates the "TV & the Internet" option being selected by the highlight 98*c*. If the enter key 66 is pressed when the highlight 98*c* is on the "TV & the Internet" option, the border changing section 38 of the processing section 20 transmits a control signal from the synthesizing section 58 to the output section 59 so as to display the television picture in which the persons are being displayed in the left-hand side and the Web display being displayed by the browser in the right-hand side as in the display screen 90*c*.

If the screen division key is pressed in the state shown in the display screen 90*c*, the screen division menu 92 may be displayed either as shown in FIG. 6(*a*) or as shown in FIG. 5(*a*).

If the "↓" key, among the up/down keys 64, is pressed, in the state shown in FIG. 6(*a*), the screen division menu 92 is changed to the state shown in FIG. 6(*b*); if the "↑" key is pressed, the screen division menu 92 is changed to the state shown in FIG. 5(*b*).

FIG. 6(*b*) illustrates the "Double Screen & the Internet" option being selected by the highlight 98*d*. If the enter key 66 is pressed when the highlight 98*d* is on the "Double Screen & the Internet" option, the border changing section 38 of the processing section 20 transmits a control signal from the synthesizing section 58 to the output section 59 so as to display the television screen in which the persons are being displayed in the upper left, the television picture in which a mountain scenery is being displayed in the lower left, and the Web display being displayed by the browser in the right-hand side as in the display screen 90*d*.

If the screen division key is pressed in the state shown in the display screen 90*d*, the screen division menu 92 may be displayed either as shown in FIG. 6(*b*) or as shown in FIG. 5(*a*).

If the "↓" key, among the up/down keys 64, is pressed in the state shown in FIG. 6(b), the screen division menu 92 is changed to the state shown in FIG. 6(c); if the "↑" key is pressed, the screen division menu 92 is changed to the state shown in FIG. 6(a).

FIG. 6(c) illustrates the "Internet" option being selected by the highlight 98e. If the enter key 66 is pressed when the highlight 98e is on "Internet" option, the border changing section 38 of the processing section 20 transmits a control signal to the synthesizing section 58 of the output section 59 so as to display the Web screen being displayed by the browser across the screen as shown in the display screen 90e.

If the screen division key is pressed in the state shown in the display screen 90e, the screen division menu 92 may be displayed either as shown in FIG. 6(c) or as shown in FIG. 5(a).

If the "↑" key, among the up/down keys 64, is pressed in the state shown in FIG. 6(c), the screen division menu 92 is changed to the state shown in FIG. 6(b). If the "↓" key, among the up/down keys 64, is pressed in the state shown in FIG. 6(c), he screen division menu 92 is changed to the state shown in FIG. 5(a).

Next, a manipulation of changing the position of a border for the divided screen on the screen division menu 92 will be described in reference to FIG. 7. FIG. 7(a) illustrates the border position having been moved to the left from the state shown in FIG. 5(b). FIG. 7(b) illustrates the border position being present at the center similarly to the state shown in FIG. 5(b). FIG. 7(c) illustrates the border position having been moved to the right from the state shown in FIG. 5(b).

In FIG. 7(a), a layout is being selected in which the divided screen to the left is narrow, the one to the right is wide, and the border is positioned to the left of the center. The layout display area 94 in the left-hand side of the highlight 98 shows an icon indicating a layout in which the divided screen to the left is narrow and the one to the right is wide.

If the "→" key, among the left/right keys 65, is pressed in the state shown in FIG. 7(a), the screen division menu 92 is changed to the state shown in FIG. 7(b).

In FIG. 7(b), a layout is being selected in which the divided screen to the left and the one to the right have the same size and the border is positioned at the center. The layout display area 94 in the left-hand side of the highlight 98 shows an icon indicating a layout in which the divided screen to the left and the one to the right have the same size.

If the "←" key, among the left/right keys 65, is pressed in the state shown in FIG. 7(b), the screen division menu 92 is changed to the state shown in FIG. 7(a); if the "→+" key is pressed, the screen division menu 92 is changed to the state shown in FIG. 7(c).

In FIG. 7(c), a layout is being selected in which the divided screen to the left is wide, the one to the right is narrow, and the border is positioned to the right of the center. The layout display area 94 in the left-hand side of the highlight 98 shows an icon indicating a layout in which the divided screen to the left is wide and the one to the right is narrow.

If the "←" key, among the left/right keys 65, is pressed in the state shown in FIG. 7(c), the screen division menu 92 is changed to the state shown in FIG. 7(b).

The foregoing embodiment shows an example in which the position of the screen dividing border is changed to three stages. This is by no means intended to be limiting the invention: the position may be changed to more stages, for example, 10%, 20%, . . . , 80%, and 90%. When that is the case, the position preferably switches continuously from one stage to another by keeping either the "→" key or the "←" key down. In addition, in the case of the "Double Screen & the Internet" layout, the position of the screen dividing border may be changeable only to the left of the center of the screen.

Next, the appearance of the picture display apparatus 10 used in the present embodiment will be briefly described in reference to FIG. 8. FIG. 8 is a schematic illustration of the appearance of the housings of the output section 59 and the input section 60.

The output section 59 houses a processing section 20 (not shown) in it. The housing of the output section 59 contains the output section 59 built around a liquid crystal panel and other components and the receiving section 30 which receives a manipulation signal from the input section 60.

The remote controller device, or input section 60, has a screen division key 61, a manipulation switching key 62, broadcast switching keys 63, up/down keys 64, left/right keys 65, an enter key 66, a back key 67, an end key 68, and a transmitting section 74.

The screen division key 61 is an input device for performing divided screen display functions. When the screen division key 61 is pressed, a corresponding input manipulations is transmitted from the transmitting section 74 to the receiving section 30 so that the menu display section 28 can display the screen division menu.

The manipulation switching key 62 is an input device for performing manipulation switching functions. When the output section 59 is displaying the television picture received by the tuner section 56 in double screen, one of the divided screens is the main divided screen, the other divided screen is the auxiliary divided screen. In a case like this, the main divided screen outputs audio and accepts various input manipulations through the input section 60, and the auxiliary divided screen only displays a picture, making no audio output, and does not accept the various input manipulations. If the manipulation switching key 62 is pressed in this situation, the main divided screen and the auxiliary divided screen are transposed, and so is the focus that indicates whether audio output capability and input manipulation compatibility are possible.

The broadcast switching keys 63 are input devices for performing broadcast switching functions. Specifically, the keys 63 are input keys corresponding to input switching between terrestrial analog broadcasting, terrestrial digital broadcasting, BS (broadcasting satellite) broadcasting, and CS (communication satellite) broadcasting. By pressing the broadcast switching keys 63, a switching to a single screen display takes place even if the screen is being divided for display so that a change takes place to a state where input manipulations for the screen are accepted (focus state).

The up/down keys 64 are input devices for manipulating the screen division menu to select a layout. A desired layout can be selected by manipulating the up/down keys 64 to move up/down the highlight when the screen division key 61 is pressed and the menu is displayed by the menu display section 28. The selected layout is entered by pressing the enter key 66 after the selection using the up/down keys 64.

The left/right keys 65 are input devices for changing the screen division position in the screen division menu. The display content for the divided screen, for example, the position of the divided screen border and the display size of the divided screen, can be changed by manipulating the left/right keys 65 when the screen division key 61 is pressed and the menu is displayed by the menu display section 28. When the screen dividing border is changed through the above manipulations, the icon display section 26 displays in the screen division menu an icon which has been updated to show the border after the changes.

The description above assumed the use of the up/down keys 64 and the left/right keys 65. Buttons, dials, wheels, sticks, trackballs, and various pointing devices may be used provided that they are input devices is capable of specifying up/down and left/right directions. Any input device may be used that is capable of changing the layout and selecting and entering a change to the position of the screen dividing border by manipulating the screen division menu.

The enter key 66 is an input device for entering a layout and a change in position of the screen dividing border. The result of a selection by the user is transmitted to the processing section 20 when the enter key 66 is pressed after the user selects one of states in the screen division menu using the up/down keys 64 and the left/right keys 65. The control section 32 updates the menu changing section 36 according to a result on the basis of the current state of the menu and the entered input manipulations.

The back key 67 is an input device for performing manipulations for discontinuing the display of the select menu and returning to the state prior to the display of the select menu. The end key 68 is an input device for ending the screen-divided display and executing a manipulation of returning to a display of only a single source.

These keys will be described as buttons provided on the remote controller device in the present embodiment in the following. This is by no means intended to be limiting the invention. The keys may be virtually displayed on a touch panel. Alternatively, inputs corresponding to the manipulations may be carried out by voice recognition. Any input device may be used provided that the device allows for entering the aforementioned inputs.

Those functions assigned to the function blocks in FIG. 1 are executed by pressing the individual keys. In other words, by pressing the screen division key 61, a corresponding input manipulation is transmitted from the transmitting section 74 to the receiving section 30, and the screen division menu is displayed by the menu display section 28.

By pressing the manipulation switching key 62, the main divided screen and the auxiliary divided screen are transposed with an accompanying switching on/off of audio output capability and input manipulation compatibility. A switching to a single divided screen display takes place even if the screen is being divided for display by pressing the broadcast switching keys 63, so that a change takes place to a state where input manipulations for the display picture are accepted.

A desired layout can be selected by manipulating the up/down keys 64 to move up/down the highlight when the screen division key 61 is pressed and the menu is displayed by the menu display section 28. The selected layout is entered by pressing the enter key 66 after the selection using the up/down keys 64. The screen dividing border can be changed by manipulating the left/right keys 65 when the division key 61 is pressed and the menu is displayed by the menu display section 28. When the screen dividing border is changed through the above manipulations, the icon display section 26 displays in the screen division menu an icon which has been updated to show the border after the changes.

The result of a selection by the user is transmitted to the processing section 20 when the enter key 66 is pressed after the user selects one of states in the screen division menu using the up/down keys 64 and the left/right keys 65. Pressing the back key 67 discontinues the display of the select menu and returns to the state prior to the display of the select menu. Pressing the end key 68 ends the screen-divided display and returns to a display of only a single picture.

Figure 9:
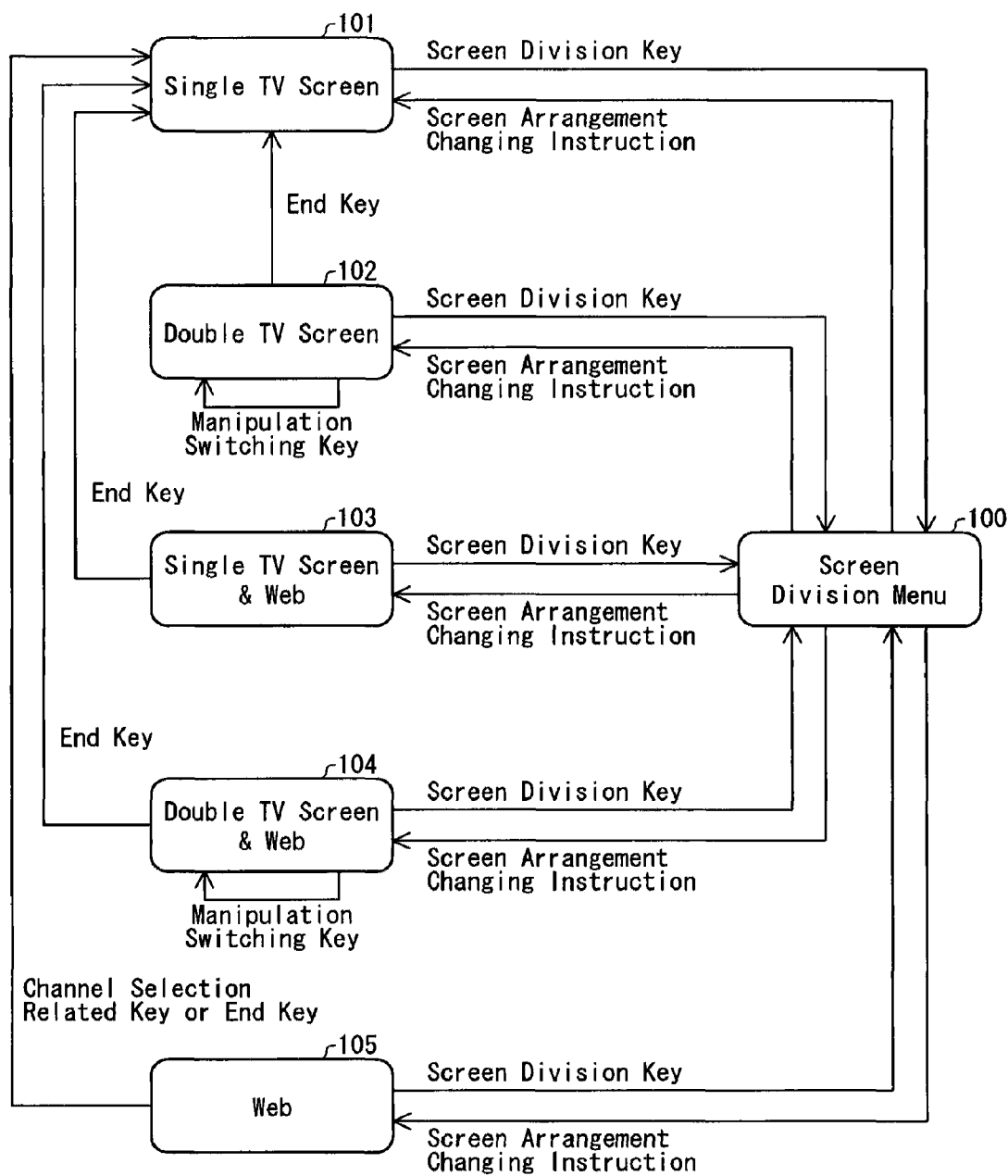
FIG. 9 is a state transition diagram for cases when changes are made to a divided screen by selecting an object in the screen division menu displayed on the picture display apparatus.

Next, a layout display switching process and a menu display process will be described in reference to FIGS. 9 to 12, the processes being performed by the control section 32. FIG. 9 is a state transition diagram for a case where an object selected using the screen division menu 92 to change the layout.

FIG. 10 is a state transition table corresponding to the state transitions in FIG. 9. In the state transition table of FIG. 10, each row shows a different one of six states shown in FIG. 9, and each column an event communicated to the control section 32. Each cell is further divided into three rows. The first row shows a pre-transition process, the second row a post-transition state, and the third row a post-transition process. An empty entry in the table indicates that either no process to be executed or no post-transition state is defined. The events include those triggered by applications and timers, as well as key events. Since the post-transition process entries are all empty here, no post-transition process exists.

Figure 11:
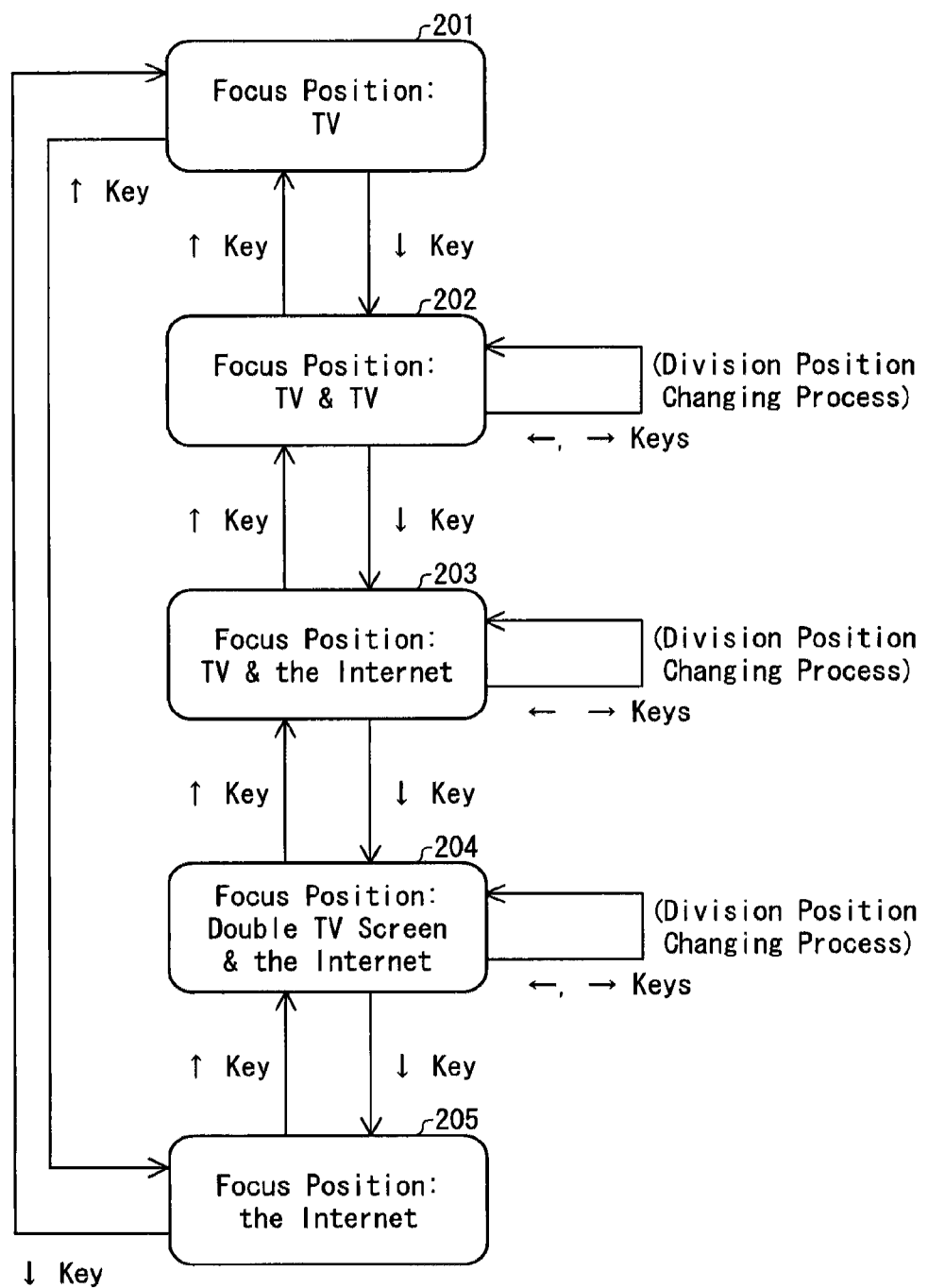
FIG. 11 is a state transition diagram for functions corresponding to key inputs, to each of which a movement and state of highlight on the screen division menu is assigned in the picture display apparatus.

FIG. 11 is a state transition diagram for functions corresponding to key inputs, to each of which a movement and state of selection where the highlight 98 is positioned on the screen division menu 92 is assigned.

FIG. 12 is a state transition table corresponding to the state transitions in FIG. 11. In the state transition table of FIG. 12, each row shows a different one of the five states, and each column an event communicated (transferred) from the control section 32. Each cell is divided into three rows. The first row shows a pre-transition process, the second row a post-transition state, and the third row a post-transition process. An empty entry in the table indicates that either no process to be executed or no post-transition state is defined. Since the post-transition process entries are again all empty here, no post-transition process exists.

In the initial state, a television picture is being output to the divided screens on the output section 59 in the "Single TV Screen" display state where the television picture is displayed across the screen (display state 101). If the screen division key 61 is pressed in the display state 101, the menu display section 28 displays the screen division menu 92 in the upper right area in the "Single TV Screen" display state (display state 100). By pressing the up/down keys 64 in a display state where the screen division menu 92 is being displayed, the menu changing section 36 moves and displays the highlight 98.

By selecting the "TV," "Double TV Screen," "TV & the Internet," "Double Screen & the Internet," and "Internet" options and pressing the enter key 66 in a state where the highlight 98 is being displayed, instructions are given to the border changing section 38 to change the layout to the "Single TV Screen" display state, a "Double TV Screen" display state (display state 102), a "Single TV Screen & Web" display state (display state 103), a "Double TV Screen & Web" display state (display state 104), and a "Web" display state (display state 105).

If the screen division key 61 is pressed in the display state 102, the menu display section 28 displays the screen division menu 92 in the upper right area of the screen. If the manipulation switching key 62 is pressed in the display state 102, the main divided screen and the auxiliary divided screen are transposed, resulting in a change to a display state where input manipulations for the picture which was being displayed in the auxiliary divided screen are accepted and audio for the auxiliary divided screen is output. This is termed a change of focus. If the end key 68 is pressed in the display state 102, the display state returns to the display state 101.

If the screen division key 61 is pressed in the display state 102, the display state 103, and the display state 104, the menu display section 28 similarly displays the screen division menu 92 in the upper right area of the screen. If the end key 68 is pressed, the display state returns to the display state 101. If the manipulation switching key 62 is pressed in the display state 104, similarly to the display state 102, the main divided screen and the auxiliary divided screen are transposed, resulting in a change to display state where input manipulations for the screen which was being displayed in the auxiliary divided screen are accepted and audio for the auxiliary divided screen is output.

Upon returning to the display state 101 by pressing the end key 68 in the display state 102 and the display state 104, one of the two television pictures which was displayed in the main divided screen is displayed. Upon returning to the display state 101 by pressing the end key 68 in the display state 105, the content of the divided screen which was last outputting a picture is output as the television picture. Specifically, the channel of which the picture was being last output is output. In addition, in the display state 105, the display state may return to the display state 101 also by pressing any of the broadcast switching keys 63, a channel-switching numeric key, or a channel key, for a television screen output.

FIG. 10 is a state transition table corresponding to the state transitions in FIG. 9. The rows in the table show display states. The columns in the table show the events communicated by the control section 32. By pressing a key in the display states, the operation shown on the top line in a cell of the table is executed, which causes a transition to the display state shown on the bottom line in that cell of the table.

FIG. 11 is a state transition diagram for functions corresponding to key inputs which change by moving the highlight 98 in the screen division menu 92.

If the "↓" key is pressed in a menu state where the "TV" option is being elected (menu state 201), the menu changing section 36 moves the highlight 98 to the menu display section 28 and displays the highlight 98, causing a transition to a menu state where the "Double TV Screen" option is being selected (menu state 202). Similarly, if the "↑" key is pressed in the menu state 201, a transition is made to a menu state where the "Internet" option is being selected (menu state 205).

If the "←" key or the "→" key is pressed in the menu state 202, a process is carried out which changes the position of the screen dividing border. First, the icon display section 26 displays as an icon a layout state where the border position has been changed. If the enter key 66 is pressed in the state where an icon indicating the changed border position is being displayed, the border changing section 38 transmits to the synthesizing section 58 a control signal to execute a process which changes the position of the screen dividing border. The synthesizing section 58 changes the border position to a site corresponding to the position of which the layout state is displayed by the icon.

If the "↑" key is pressed in the menu state 202, the menu changing section 36 moves the highlight 98 to the menu display section 28 and displays the highlight 98, causing a transition to the menu state 201; if the "↓" key is pressed, the section 36 similarly moves and displays the highlight 98, causing a transition to a menu state where the "TV & the Internet" option is being selected (menu state 203).

If the "←" key or the "→" key is pressed in the menu state 203, similarly to the menu state 202, a process is carried out which changes the position of the screen dividing border. Similarly, if the "↑" key is pressed in the menu state 203, a transition is made to the menu state 202; if the "↓" key is pressed, a transition is made to a menu state where the "Double TV Screen & the Internet" option is being selected (menu state 204).

If the "→" key or the "←" key is pressed in the menu state 204, a process is carried out, similarly to the foregoing, which changes the position of the screen dividing border. In addition, if the "↑" key is pressed in the menu state 204, a transition is made similarly to the menu state 203; if the "↓" key is pressed, a transition is made to a menu state where the "Internet" option is being selected (menu state 205).

If the "↑" key is pressed in the menu state 205, a transition is made to the menu state 204; if the "↓" key is pressed, a transition is made to the menu state 201.

FIG. 12 is a state transition table corresponding to the state transitions in FIG. 11. The rows in the table show display states. The columns in the table show the keys of the input section 60. By pressing a key in the display states, the operation shown on the top line a cell of the table is executed, which causes a transition to the display state shown on the bottom line in that cell of the table.

As described in the foregoing, the picture display apparatus 10 of the present invention, to solve the problems, is characterized in that it includes: a synthesizing section 58 for synthesizing divided screens to display a plurality of pictures on a single screen; a menu display section 28 for displaying a menu in which a list of options is displayed, the options enabling a user to select a change to be made to at least one of a number, shapes, relative sizes, and relative positions of the divided screens and types of the pictures, so that the user can select from the options to switch to a corresponding layout; an icon display section 26 for displaying an icon indicating a border between the divided screens in association with the options; and a border changing section 38 for updating the divided screens according to a change in position of the border, wherein the icon display section 26 displays the icon indicating a result of the change before the divided screens are updated according to the change in position of the border.

According to the arrangement, the menu display section 28 displays. next to each other, the icons displayed by the icon display section 26. When the user enters a change to the layout using the up/down keys 64, an icon indicating a result of a change in position of the border can be displayed before the user enters the change in position of the border using the left/right keys 65. Thus, the picture display apparatus 10 enables the user to be informed of how the border will change before the border is updated according to the change.

The picture display apparatus 10 is characterized in that the up/down keys 64 for inputting "up" or "down" are associated as first changing means for inputting a manipulation for a selection from the options and also that the left/right keys 65 for inputting "right" or "left" are associated as second changing means for inputting a manipulation for a change in position of the border.

According to the arrangement, the user changes the layout with the up/down keys 64 and the border with the left/right keys 65. The picture display apparatus 10 thus enables the user to input, by simple manipulations, switching between layouts and a change in position of the border without switching between menus.

The picture display apparatus 10 is characterized in that it further includes a memory section 34 for holding border position information, wherein the menu changing section 36 accesses the memory section 34 and changes the border position on the basis of information on the position of the divisional border set up last time.

According to the arrangement, the picture display apparatus 10 is such that the memory section 34 holds the border position information and that the menu changing section 36 accesses the border position information being held to change the border position.

The picture display apparatus 10 is characterized in that the display screen is at least one of picture display screens, browser's display screens, slide display screens, and photo display screens.

According to the arrangement, the display screen is divided to display various different information, such as pictures, browsers, slides, and photographs. The picture display apparatus 10 thus enables the user to view various information in conjunction.

The picture display apparatus 10 further includes a memory section 34 for holding parameters related to the divided display screen, wherein the menu display section 28 accesses the memory section 34 to display a menu.

According to the arrangement, the menu display section 28 can access the memory section 34 when displaying a menu. Thus, the picture display apparatus 10 enables the user to select a suitable layout in accordance with the content of the picture to be displayed simply by changing a divisional template in the memory section 34. In addition, by holding a user-defined layout in the memory section 34, the user can retrieve user-defined settings as a template at any time and restores the original layout by retrieving it.

The picture display apparatus 10 further includes a communications section 52 for receiving related information on the pictures being displayed, wherein the menu display section 28 refers to the related information to display a menu.

According to the arrangement, the picture display apparatus 10 enables the user to enter a suitable layout on the basis of the related information received by the communications section 52 and update the divided screen accordingly.

The picture display method of the present invention, to solve the problems, involves the steps of: the synthesizing section 58 synthesizing divided screens to display a plurality of pictures on the output section 59; the menu display section 28 displaying a menu in which a list of options is displayed, the options enabling a user to select a change to be made to at least one of a number, shapes, relative sizes, and relative positions of the divided screens and types of the pictures, so that the user can select from the options to switch to a corresponding layout; the icon display section 26 displaying an icon indicating a border between the divided screens in association with the options; and the icon display section 26 updating the divided screens according to the change in position of the border.

According to the arrangement, icons are displayed in the layout display step. The icons are displayed next to each other in the menu display step. The step of displaying an icon indicating a result of the change of the divisional border is executed before a positional change of the border is entered in the border changing step in the step of the user entering a display switching. Therefore, the picture display method enables the user to be informed of how the border will change before the change of the border is entered.

Some content of display by the browser can only be displayed across the entire screen, not in a divided, vertically elongated area, due to layout and design. That content is termed here horizontally elongated limitation content. When a manipulation of navigating following a link on a browser is carried out in the "TV & the Internet" display state or in the "Double Screen & the Internet" display state to make a transition to horizontally elongated limitation content, the display may automatically switch to the "Internet" display state. In contrast, when making a transition from the horizontally elongated limitation content to ordinary content, the display may remain in the "Internet" display state and does not need to return to the "TV & the Internet" or the "Double Screen & the Internet."

The picture display apparatus of the present invention, to solve the problems, is characterized in that it includes: a synthesizing section for synthesizing divided screens to display a plurality of pictures on a single screen; a menu display section for displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement; a layout display section for displaying an icon indicating a border between the divided screens in association with the options; and a border changing section for updating the divided screens according to a change in position of the border, wherein the layout display section displays the icon indicating a result of the change in position of the border before the border changing section updates the divided screens according to the change in position of the border.

According to the arrangement, a menu is displayed for the user to make a selection so as to change to the layout according to which a plurality of pictures are displayed on a single screen. In the menu, an icon is displayed which indicates the position of the border between divided screens in which the pictures are displayed. Thereafter, the icon indicates a new position of the border before updating the screen according to a change in position of the border. Thus, the user is informed of what the screen will look like before entering a change of the border.

The picture display apparatus includes: first change input means for receiving an operation for the selection from the options; and second change input means for receiving an operation for the change in position of the border.

According to the arrangement, the changing of the layout and the changing in position of the border are assigned to different input means. This allows the operations to be assigned in such a manner that the user can make inputs easily.

The picture display apparatus is characterized in that: the menu display means displays the options in rows; the border changing means changes the position of the border horizontally and updates the divided screens accordingly; the first change input means is associated with up/down input means for inputting either an upward direction or a downward direction; and the second change input means is associated with left/right input means for inputting either a left direction or a right direction.

According to the arrangement, the user can switch between divided displays using an up/down key and change the display screen using a left/right key. The user can switch between layouts and change the display screen through easy operations without having to switch between menus.

The picture display apparatus includes change information memory means for holding the result of the changes to the display screen, wherein the menu display means accesses the change information memory means to display a menu updated according to a result of latest changes.

According to the arrangement, the change information memory means holds information on the changes made to the display screen. The menu display means can hence access the information on the layout and the border position in the memory means and update the menu display accordingly.

The picture display apparatus includes related information receiving means for receiving information related to at least one of the pictures being displayed on the screen, wherein the menu display means displays the menu according to the related information.

According to the arrangement, a suitable layout is determined according to the related information received by the related information receiving means for an updated screen display.

Furthermore, the menu can be displayed by accessing division information memory means. The user can select a layout that is suitable to the content of the displayed picture simply by changing division information. In addition, user-defined settings can be retrieved as a template at any time by registering a user-defined layout in divisional template memory means. Also, the original layout can be retrieved and restored.

The picture display method may be executed on a computer under the control of the computer. Furthermore, the picture display program may be stored on a computer-readable storage medium so that it can be executed on any computer.

As described in the foregoing, the picture display apparatus and method of the present invention displays a menu for the user to make a selection so as to change the layout according to which a plurality of pictures are displayed on a single screen. The apparatus and method displays, in the menu, an icon indicating the position of the border between the divided screens. Thereafter, the apparatus and method displays the icon so that it indicates a new position of the border before updating the screen according to a change in position of the border. Thus, the user is informed of what the screen will look like before entering a change of the border.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the picture display apparatus 10, especially, the display managing section 22, the menu changing section 36, and the border changing section 38 of the processing section 20, may be realized by hardware or software as executed by a CPU as follows:

The picture display apparatus 10 includes a CPU (central processing unit) and memory devices (memory media). The CPU executes instructions in control programs realizing the functions. The memory devices may be a ROM (read only memory) which contains programs, a RAM (random access memory) to which the programs are loaded, or a memory containing the programs and various data. The objective of the present invention can also be achieved by mounting to the picture display apparatus 10 a computer-readable storage medium containing control program code (executable program, intermediate code program, or source program) for the picture display apparatus 10 which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The picture display apparatus 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, electric power line, cable TV line, telephone line, or ADSL; or wireless, such as infrared radiation (IrDA, remote control), Bluetooth (Registered Trademark), 802.11 wireless, HDR, mobile telephone network, satellite line, or terrestrial digital network. The present invention encompasses a carrier wave or data signal transmission in which the program code is embodied electronically.

What is claimed is:

1. A picture display apparatus, comprising:
 a combining section combining divided screens to display a plurality of pictures on a single screen;
 a menu display section displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement;
 an icon display section displaying an icon indicating a border between the divided screens in association with the options;
 a border changing section updating the divided screens according to a change in position of the border;
 a first change input interface receiving an operation for the selection from the options; and
 a second change input interface receiving an operation for the change in position of the border, wherein
 the icon display section displays the icon indicating a result of the change in position of the border before the border changing section updates the divided screens according to the change in position of the border.

2. The picture display apparatus of claim 1, wherein:
 the menu display section displays the options in rows;
 the border changing section changes the position of the border horizontally and updates the divided screens accordingly;
 the first change input interface is associated with up/down input device inputting either an upward direction or a downward direction; and
 the second change input interface is associated with left/right input device inputting either a left direction or a right direction.

3. The picture display apparatus of claim 1, further comprising:
 a change information memory holding the result of the changes to the screen, wherein
 the menu display section accesses the change information memory to display a menu updated according to a result of latest changes.

4. A picture display apparatus, comprising:
 a combining section combining divided screens to display a plurality of pictures on a single screen;
 a menu display section displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement;

an icon display section displaying an icon indicating a border between the divided screens in association with the options;

a border changing section updating the divided screens according to a change in position of the border;

a related information receiver receiving information related to at least one of the pictures being displayed on the screen, wherein the menu display section displays the menu according to the related information, and the icon display section displays the icon indicating a result of the change in position of the border before the border changing section updates the divided screens according to the change in position of the border.

5. A picture display method, comprising:

synthesizing divided screens to display a plurality of pictures on a single screen;

displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement;

displaying an icon indicating a border between the divided screens in association with the options;

receiving an operation for the selection from the options from a first change input interface;

receiving an operation for the change in position of the border from a second change input interface;

displaying the icon indicating a result of the change in position of the border before updating the divided screens according to the change in position of the border; and updating the divided screens according to the change in position of the border.

6. A tangible computer-readable storage medium, containing a picture display program causing a picture display apparatus to operate, the program causing a computer to implement the steps of:

synthesizing divided screens to display a plurality of pictures on a single screen;

displaying a menu in which a list of options is displayed, the options enabling a user to select a change to be made to at least one of a number, shapes, relative sizes, and relative positions of the divided screens and types of the pictures, so that the user can select from the options to switch to a corresponding screen arrangement;

displaying an icon indicating a border between the divided screens in association with the options;

receiving an operation for the selection from the options from a first change input interface;

receiving an operation for the change in position of the border from a second change input interface;

displaying the icon indicating a result of the change in position of the border before updating the divided screens according to the change in position of the border; and updating the divided screens according to the change in position of the border.

* * * * *